United States Patent
Martins et al.

(10) Patent No.: US 6,802,511 B1
(45) Date of Patent: Oct. 12, 2004

(54) SEAL END PLATE

(75) Inventors: Armado S. Martins, Cumberland, RI (US); Stephen A. Bonazoli, Worcester, MA (US)

(73) Assignee: Morgan Construction Company, Worcester, MA (US)

( * ) Notice: Subject to any disclaimer, the term of this patent is extended or adjusted under 35 U.S.C. 154(b) by 1 day.

(21) Appl. No.: 10/365,278

(22) Filed: Feb. 12, 2003

(51) Int. Cl.[7] .................................................. F16J 15/32
(52) U.S. Cl. ........................ 277/572; 277/563; 384/486
(58) Field of Search ................................ 277/572, 562, 277/563, 566; 384/486

(56) References Cited

U.S. PATENT DOCUMENTS

| | | | |
|---|---|---|---|
| 2,868,574 A | * | 1/1959 | Rich, Jr. ..................... 277/351 |
| 3,832,021 A | * | 8/1974 | Jennings et al. ............ 277/321 |
| 4,099,731 A | * | 7/1978 | Salter, Jr. .................... 277/367 |
| 4,234,196 A | | 11/1980 | Iida |
| 4,389,053 A | | 6/1983 | Innis, Jr. et al. |
| 4,435,096 A | | 3/1984 | Petros |
| 4,455,856 A | | 6/1984 | Salter, Jr. et al. |
| 4,630,458 A | | 12/1986 | Kakabaker |
| 4,667,967 A | * | 5/1987 | Deuring ..................... 277/351 |
| 4,772,137 A | | 9/1988 | Salter, Jr. et al. |
| 4,799,808 A | | 1/1989 | Otto |
| 4,866,827 A | | 9/1989 | Benfer et al. |
| 5,404,963 A | | 4/1995 | Crepas et al. |
| 5,478,090 A | | 12/1995 | Simmons et al. |
| 6,146,020 A | * | 11/2000 | Innis, Jr. .................... 384/486 |

* cited by examiner

Primary Examiner—Alison K. Pickard
(74) Attorney, Agent, or Firm—Gauthier & Connors

(57) ABSTRACT

A seal end plate is configured and dimensioned to surround the neck of a horizontal roll in a rolling mill and comprises a circular body having a shoulder projecting axially from its outboard side. At least one well is provided on the shoulder, and a drainage passageway leads from the well to the outboard side of the body. The drainage passageway is located in a one angularly spaced from horizontal and vertical reference planes bisecting the seal end plate.

6 Claims, 2 Drawing Sheets

SEAL END PLATE

BACKGROUND OF THE INVENTION

1. Field of the Invention

This invention relates generally to oil film bearings for rotatably supporting the necks of horizontal rolls in a rolling mill, and is concerned in particular with an improved seal end plate for use as an integral component of the seal assemblies of such bearings.

2. Description of the Prior Art

Typical seal assemblies are disclosed, for example, in U.S. Pat. No. 5,478,090 (Simmons et al.); U.S. Pat. No. 4,455,856 (Salter, Jr. et al.); and U.S. Pat. No. 4,389,053 (Innis Jr. et al.).

In these seal assemblies, a flexible neck seal is received on and rotates with the roll neck. A seal end plate surrounds and is fixed relative to the neck seal. Resilient inboard and outboard flanges project radially outwardly from the neck seal to straddle a radially inwardly projecting rigid flange on the seal end plate. The outboard seal flange coacts in sealing contact with an outboard shoulder of the seal end plate to retain oil in the bearing, and the inboard seal flange coacts in sealing contact with an inboard shoulder of the seal end plate to prevent cooling water from penetrating into the bearing.

As the neck seal flanges begin to wear due to prolonged usage, oil may eventually succeed in penetrating beneath the outboard neck seal flange. The oil then will be dragged around the seal end plate by the rotating neck seal, and may eventually escape past the seal end plate flange and leak from the bearing.

SUMMARY OF THE INVENTION

The present invention prevents the above described leakage from occurring by providing the seal end plate with strategically positioned wells that trap any oil penetrating beneath the outboard neck seal flange. Drain passageways return the thus trapped oil from the wells back to the bearing sump for recirculation in the lubrication system of the mill.

These and other features and advantages of the present invention will now be described in greater detail with reference to the accompanying drawings, wherein:

DETAILED DESCRIPTION OF PREFERRED EMBODIMENT

Figure 1:
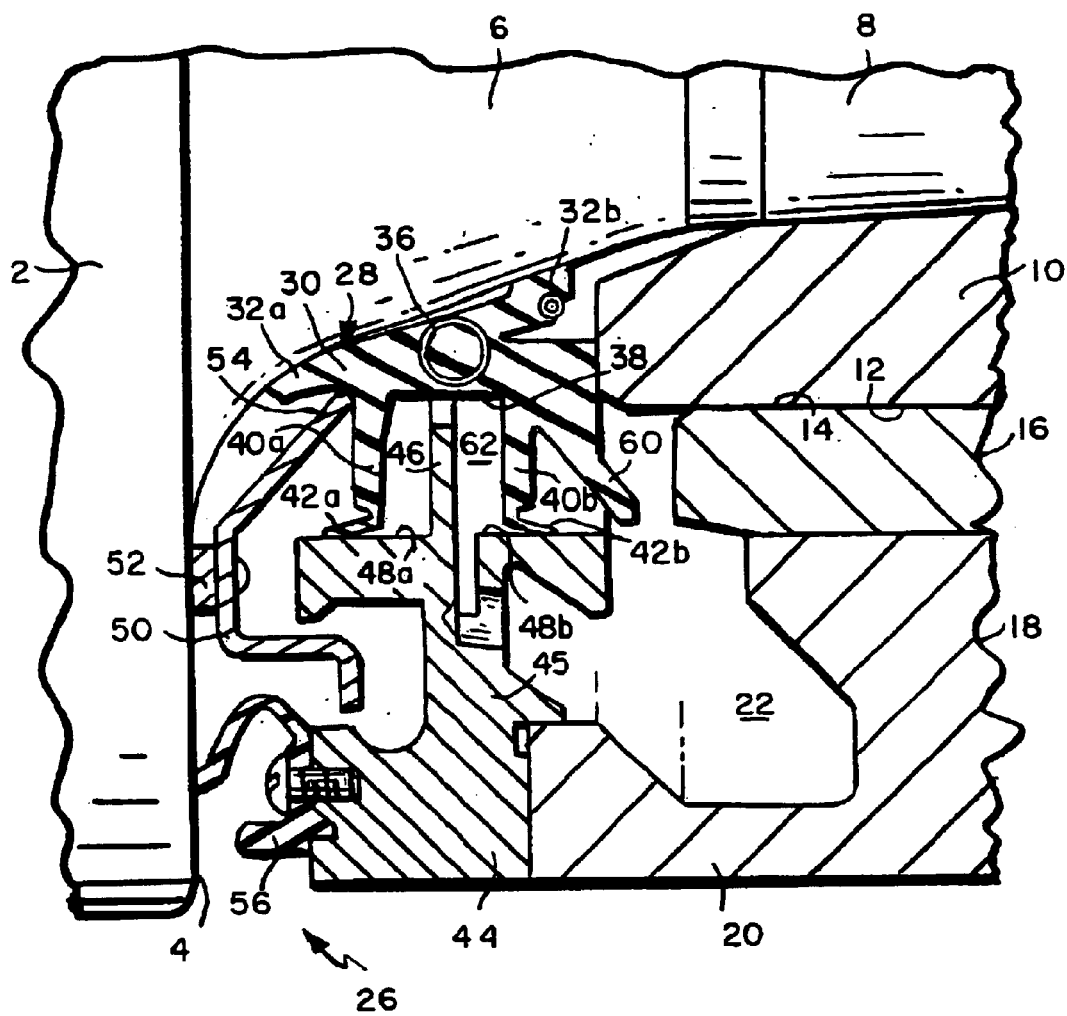
FIG. 1 is a cross sectional view through a seal assembly embodying a seal end plate in accordance with the present invention.

Referring now to the drawings, and with initial reference to FIG. 1, there is shown at 2 a roll having an end face 4 and a roll neck with a tapered intermediate section 6 leading to a more gradually tapered end section 8. A sleeve 10 is mounted on the tapered end section 8 and is fixed relative to the roll neck by conventional means (not shown) for rotation therewith. The sleeve 10 has an external bearing surface 12 journalled for rotation within an interior bearing surface 14 of a fixed bushing 16 enclosed by a chock 18. The sleeve 10 rotates with the roll while the chock 18 and the bushing 16 remain stationary. Oil is continuously supplied at a rate of flow sufficient to provide for a hydrodynamically maintained film between bearing surfaces 12, 14 at the bearing load zone. An axial extension 20 of the roll chock forms a sump 22 in which the oil emerging from between the bearing surfaces 12, 14 is continuously collected. The oil is drawn away from the sump through a suitable piping connection (not shown) to be recycled in the lubrication system of the mill.

Under so-called "wet" rolling applications, cooling water is continuously flooded over the roll 2 and down over its end face 4. In spite of the centrifugal forces which tend to throw the water off of the roll, some of the water tends to work its way along the roll neck in the direction of the bearing. The objective of the seal assembly generally indicated at 26 and the flexible neck seal 28 which forms a part of the seal assembly, is to prevent the cooling water from reaching and contaminating the bearing oil while at the same time preventing loss of oil from the bearing.

The neck seal 28 includes a flexible circular seal body 30 with lips 32a, 32b in sealing contact with the tapered section 6 of the roll neck. The neck seal 28 is molded of a suitable resilient rubber-like material. Preferably, the seal body 30 is internally reinforced by an embedded combination of a coiled spring 34 and a steel cable 36 as described in U.S. Pat. No. 3,330,567.

The seal body 30 has an exterior cylindrical surface 38 which is parallel to the rotational axis of the roll 2 when the neck seal is in its mounted position as shown in FIG. 1. A pair of resilient inboard and outboard flanges 40a, 40b are integral with and extend radially outwardly from the seal body 30 at opposite ends of the exterior cylindrical surface 38. The flanges 40a, 40b are advantageously provided with angled oppositely facing lips 42a, 42b.

In accordance with the present invention, the seal assembly also includes a rigid seal end plate 44 having a circular body 45 fixed to the axial extension 20 of the chock 18. The seal end plate has a radially inwardly extending rigid flange 46 that is perpendicular to the rotational axis of the roll 2. The inner edge of flange 46 is spaced radially from the exterior cylindrical surface 38 on the flexible seal body. The seal end plate further includes inboard and outboard shoulders 48a, 48b extending axially in opposite directions from the rigid flange 46. The shoulders 48a, 48b surround the resilient seal flanges 40a, 40b and are arranged to be sealingly contacted by the angled lips 42a, 42b.

The seal assembly 26 further includes a seal inner ring 50 optionally having resilient buttons 52 engaging the end face 4 of the roll. The inner edge of the seal inner ring contacts the flexible seal body as at 54, and a resilient water guard 56 surrounds the seal inner ring 50.

During a rolling operation, the seal inner ring 50, flexible neck seal 28 and sleeve 10 rotate with the roll neck. The water guard 56, seal end plate 44, chock 18 and bushing 16 remain stationary.

Most of the externally applied coolant will be deflected away from the bearing interior by the water guard 56. Any coolant that succeeds in penetrating past the water guard will be trapped and turned away by the labyrinth created between the seal end plate 44 and the seal inner ring 50, with final blockage being provided by the sealing contact of the lip 42a of the inboard neck seal flange 40a with the inboard shoulder 48a of the seal end plate. Lubricating oil will constantly flow from between the bearing surfaces 12 and 14. Most of this oil will be turned back by a rotating flinger 60 on the neck seal 28 and will thus be directed to the sump 22.

Oil that succeeds in passing around the flinger 60 will be turned back by the sealing contact of the lip 42b of the outboard neck seal flange 40b with the outboard shoulder 48b of the seal end plate. However, as the lip 42b wears, oil may eventually succeed in penetrating into the annular space 62 between the outboard neck seal flange 40b and the rigid flange 46 of the seal end plate. Oil in the space 62 will be dragged around the seal end plate 44 by the rotating neck seal 28. In conventional seal assemblies, this oil may escape around the rigid flange 46 and eventually leak from the bearing.

Figure 4:
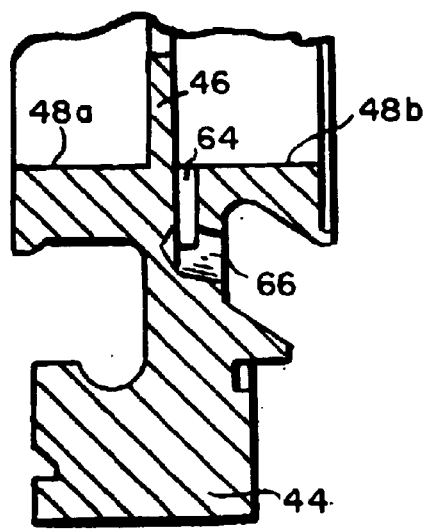
FIG. 4 is a sectional view on an enlarged scale taken along line 4-4 of FIG. 3.
Figure 2:
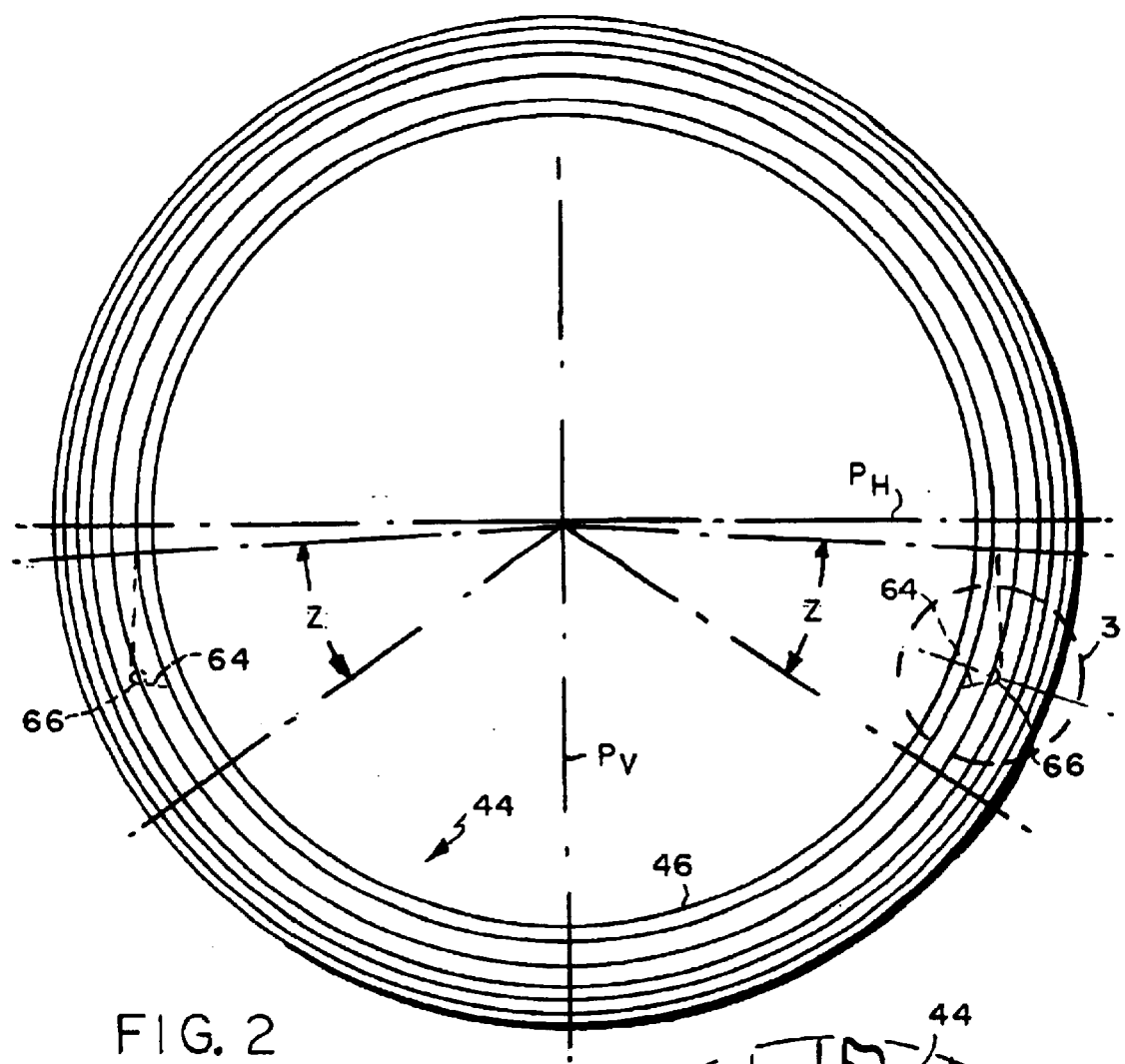
FIG. 2 is an elevational view of the outboard side of the seal end plate shown in FIG. 1.
Figure 3:
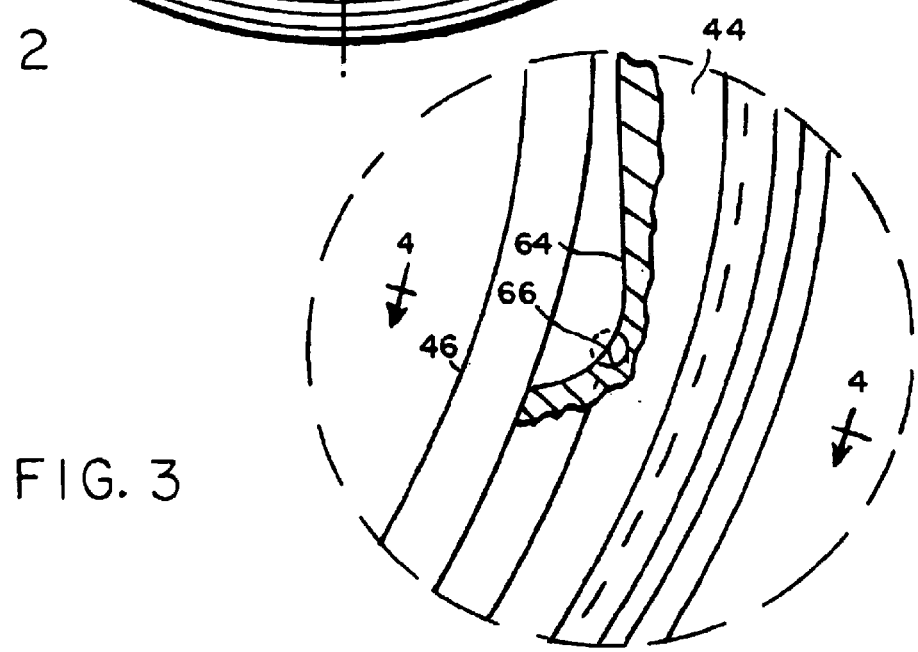
FIG. 3 is an enlarged partially broken away view of the circled area shown in FIG. 2.

In accordance with the present invention, and as can best be seen by further reference to FIGS. 2–4, the body of the seal end plate 44 is additionally provided with at least one and preferably two wells 64 located at the juncture between the outboard shoulder 48b and the flange 46. The wells communicate with downwardly inclined drainage passageways 66 leading back to the sump 22. The drainage passageways are located within zones Z angularly spaced from horizontal and vertical reference planes $P_h$, $P_v$ bisecting the seal end plate. Preferably, the zones Z extend angularly and downwardly from 15° to 35° from the horizontal plane $P_h$, with the optimum position for the drainage passageways 66 being about midway between these boundaries, i.e., at about 25° from plane $P_h$.

With this arrangement, any oil escaping into the space 62 will be captured in the wells 64 and returned to the sump 22 via drainage passageways 66. The wells and their respective drainage passageways are strategically positioned to gravitationally receive and recover the oil, without creating a risk of reverse outflow in the event that the sump 22 experiences flooding.

While a specific embodiment of the invention been shown and described in detail to illustrate the application of the inventive principles, it will be understood that the invention may be embodied otherwise without departing from such principles.

We claim:

1. A seal end plate configured and dimensioned to surround the neck of a horizontal roll in a rolling mill, said seal end plate comprising:

a circular body;

a shoulder projecting axially from an outboard side of said body;

at least one well in said shoulder; and a drainage passageway leading from said well to the outboard side of said body, said drainage passageway being located in a zone angularly spaced from horizontal and vertical reference planes bisecting the seal end plate.

2. The seal end plate of claim 1 further comprising a flange projecting radially inwardly from said body at a juncture with said shoulder, said well being located at said juncture.

3. The seal end plate of claim 1 or 2 wherein said zone extends angularly and downwardly about 15–35° from said horizontal reference plane.

4. The seal end plate of claim 3 wherein said drainage passageway is located angularly and downwardly at about 25° from said horizontal reference plane.

5. The seal end plate of claim 1 or 2 wherein one of said wells is located on each side of said vertical reference plane.

6. A circular seal end plate for use in an oil film bearing of the type employed to rotatably support the neck of a horizontal roll in a rolling mill, said bearing including a sleeve fixed to the neck for rotation therewith, a bushing fixed in a chock and within which the sleeve is journalled for rotation on a film of oil hydrodynamically maintained between the sleeve and the bushing, and a flexible seal encircling and rotatable with the roll neck at a location adjacent to the sleeve, said seal having a radially outwardly projecting resilient flange, said seal end plate comprising:

a circular body adapted to be secured to said chock at a location surrounding said seal, said body being configured to cooperate with said chock in defining a sump for receiving oil emerging from between said sleeve and said bushing;

a shoulder projecting axially from said circular body, said shoulder being configured and arranged to be contacted by said resilient flange at a sealing interface;

a rigid flange projecting radially inwardly from said circular body at a juncture with said shoulder, said rigid flange cooperating with said shoulder to axially retain any leakage of oil past said sealing interface;

wells in said circular body at said juncture, said wells being positioned to gravitationally receive the thus retained leakage of oil; and drainage passageways in said circular body leading from said wells to said sump for returning the thus trapped leakage of oil to said sump, said wells being located in lower quadrants of said seal end plate in zones angularly spaced from horizontal and vertical reference planes bisecting said seal and plate.

* * * * *